(12) United States Patent
Kraft

(10) Patent No.: US 6,309,305 B1
(45) Date of Patent: Oct. 30, 2001

(54) INTELLIGENT COPY AND PASTE OPERATIONS FOR APPLICATION HANDLING UNITS, PREFERABLY HANDSETS

(75) Inventor: Christian A Kraft, Copenhagen (DK)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/096,692

(22) Filed: Jun. 12, 1998

(30) Foreign Application Priority Data

Jun. 17, 1997 (GB) .................................................. 9712781

(51) Int. Cl.[7] .................................................. H04M 11/00
(52) U.S. Cl. ........................... 465/566; 455/414; 455/575
(58) Field of Search .................................... 455/566, 550, 455/565, 575, 95, 414; 345/133; 707/100

(56) References Cited

U.S. PATENT DOCUMENTS

| 5,479,476 | 12/1995 | Finke-Anlauff | 379/58 |
|---|---|---|---|
| 5,765,156 | * 6/1998 | Guzak et al. | 707/100 |
| 5,784,001 | * 7/1998 | Deluca et al. | 345/133 |
| 5,920,826 | * 7/1999 | Metso et al. | 455/556 |
| 6,044,248 | * 3/2000 | Mochizuki et al. | 455/566 |

FOREIGN PATENT DOCUMENTS 0 463 856 B1    1/1992    (EP) .

* cited by examiner

Primary Examiner—Daniel Hunter
Assistant Examiner—Thuan T. Nguyen
(74) Attorney, Agent, or Firm—Perman & Green, LLP

(57) ABSTRACT

A phone including a CPU controlling a plurality of applications, a working storage that holds data and programs used in said applications and storage means acting as a clipboard when copying and pasting data from one application to another. Via the keyboard of the phone data contained in one application may be selected for copying to a clipboard. The CPU identifies predetermined types of subitems in the contents of the data copied to the clipboard. When pasting, said types of subitems may be displayed for individual pasting from the clipboard into the position in said another application appointed by the pasting command.

25 Claims, 4 Drawing Sheets

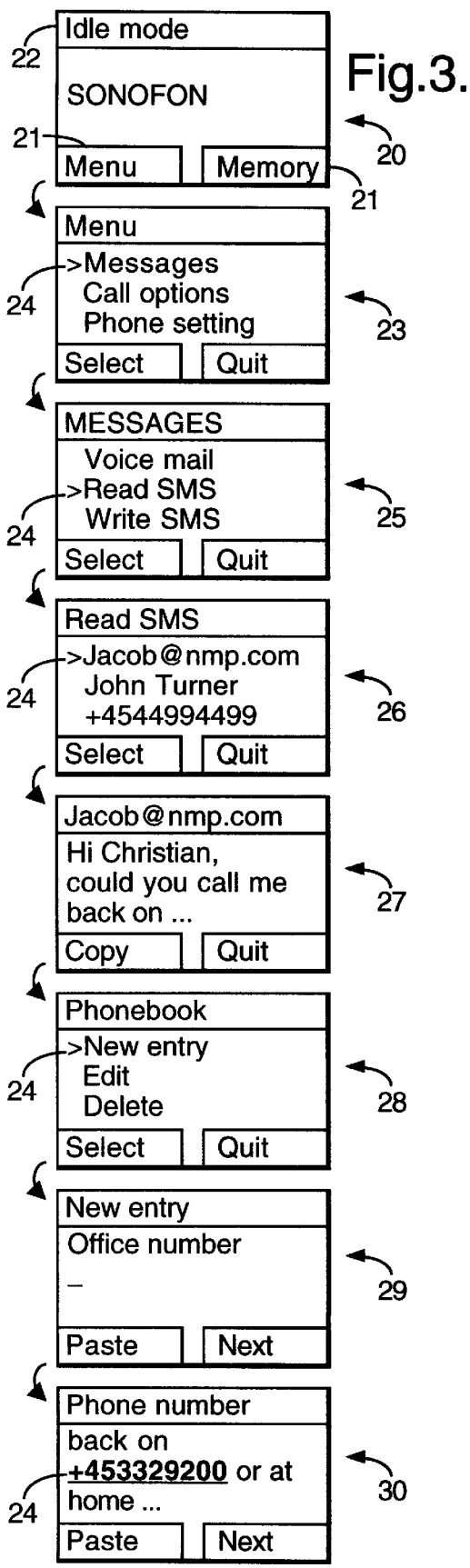
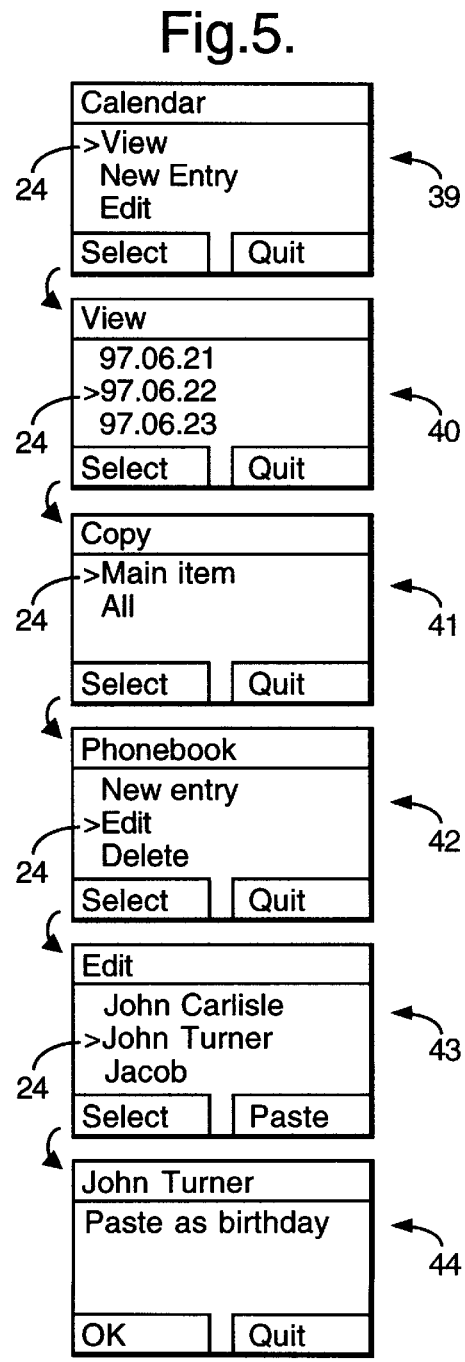
Fig.3.
Fig.5.

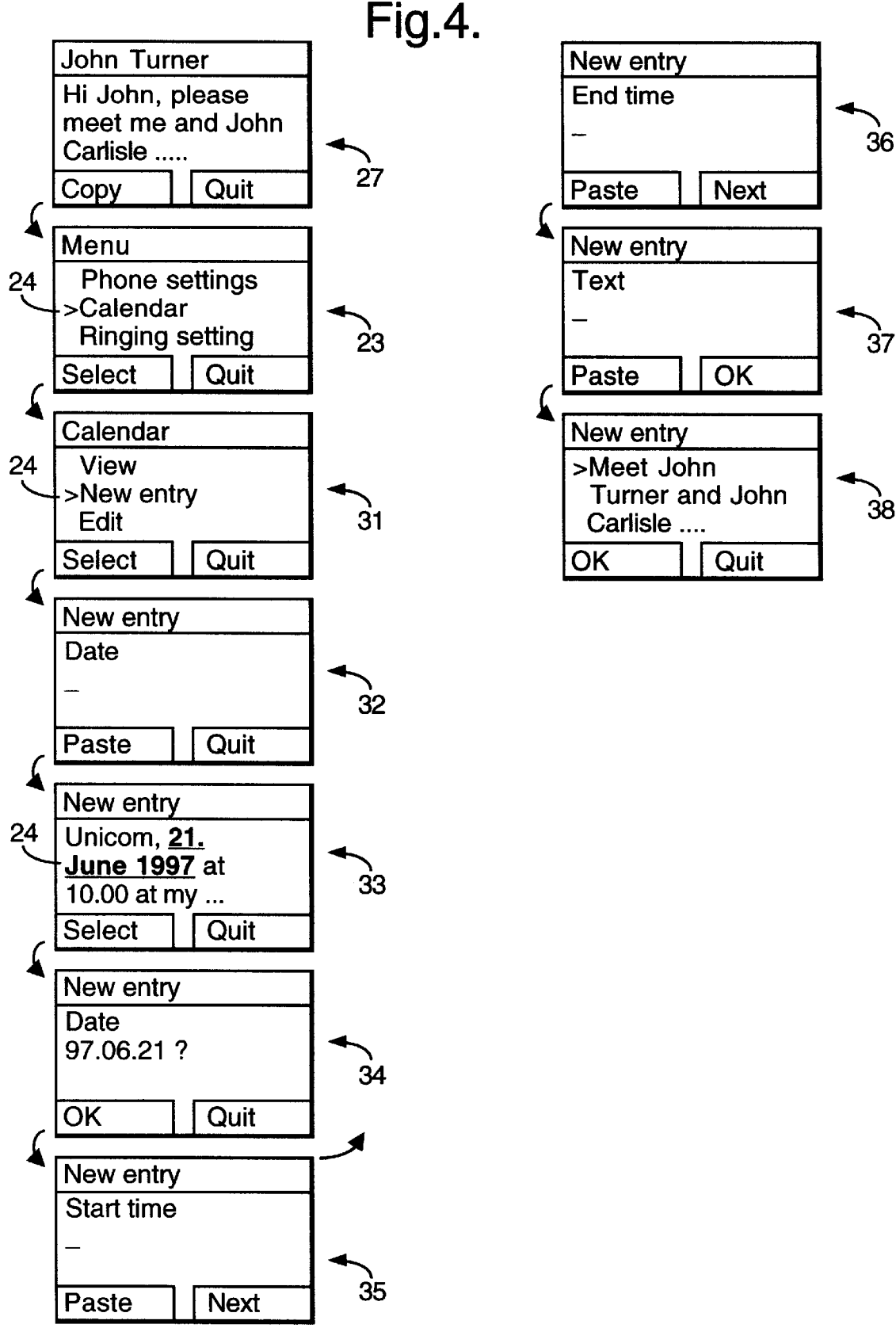

INTELLIGENT COPY AND PASTE OPERATIONS FOR APPLICATION HANDLING UNITS, PREFERABLY HANDSETS

BACKGROUND OF THE INVENTION

The invention relates to a method of transferring data from one application to another in an application handling unit controlling a plurality of applications. The invention furthermore relates to such an application handling unit and especially a handset or a portable phone.

The copy and paste function is generally known from the applications available in Windows® from Microsoft Corporation®. However, the copy and paste function can be used to copy text strings from one application to another or from one document in one application to another document in the same application or from one location in a document to another location in the same document.

The CPU of the computer uses a RAM as a primary storage to hold programs and data for all applications—at least the open ones. When selecting a text string and copying this string to the clipboard, this string will be stored in a space in the RAM specially dedicated as a clipboard memory. The cutting operation is basically the same, but the selected text string will be copied to the clipboard, whereas it will be removed from the original file/document.

Hereby the contents in the clipboard will be present for pasting even though the application from which the string was copied will be closed. When moving the cursor to a new position either in the same file or in another file, the contents of the clipboard may be pasted to this position. The contents of the clipboard will not be affected by the pasting, whereby the pasting may be repeated several times. This type of cut/copy and paste operation is excellent when handling text documents by means of e.g. a Personal Computer (PC) having a full keypad and a mouse for moving the cursor.

However, in a portable phone, the number of input key s compared with a PC is very low, and cursor navigation keys only allow a limited navigation through a text string, e.g. an SMS message, so that it will be easier to rewrite a word than to use a copy and paste function.

SUMMARY OF THE INVENTION

In accordance with the invention there is provided a method of transferring data from one application to another in an application handling unit controlling a plurality of applications, said transfer being handled by copying data to and pasting data from clipboard storage means, said method comprising identifying predetermined types of subitems in the contents of the data copied to the clipboard; and displaying said types of subitems for selection by the user upon reception of a pasting request for the data on the clipboard into said another application.

The transfer is handled by copying data to clipboard storage means as a complex data structure, e.g. a full SMS message including all available information e.g. the text message and the sender ID. Then the complex data structure is analyzed, and predetermined types of subitems in the complex data structure are identified. These subitems may be ordinary words, phone numbers or dates. When the user requests the pasting of an item in the complex data structure into another application, a list of subitems will be displayed and the user may select the item which he finds appropriate to paste. The main difference compared with prior art is that the transferred item is defined when pasting from the clipboard instead of when copying to the clipboard. The text editing facilities on a phone are very poor at present in contrast to the menu selection facilities. An example of the menu selection facilities is given in EP 463 856.

The invention provides a user interface which has a copy and paste function for copying data between applications and which is easy to use.

To reduce the length of the list presented when pasting, some analyzing may be performed upon the detection of a pasting request. When an SMS message has been requested to be pasted into a phone number memory location in a phone book, only words allowable according the phone number syntax rules may be presented.

First, the contents of the complex data structure are divided into separate words by detecting dividing points as spaces or the like. Then each of the words may be compared with the syntax rules valid for the pasting position.

The invention furthermore relates to an application handling unit including a CPU controlling a plurality of applications, a working storage that holds data and programs used in said applications and storage means acting as a clipboard when copying and pasting data from one application to another. This unit furthermore comprises means for selecting data contained in one application for copying to the clipboard, means for identifying predetermined types of subitems in the contents of the data copied to the clipboard, and means for displaying said types of subitems for selection by the user upon reception of a pasting request for the data on the clipboard into said another application. Hereby the selected unbroken string in one application will be broken down to a list of individually selectable items for pasting from the clipboard.

A handset or a phone comprises information inputting means, a display, a controller unit that controls the input means and the display and a plurality of applications available to the user. The controller unit is provided with memory means for temporarily storing data used in said applications. When a data set used in one of said applications is selected for copying to the clipboard, the controller unit gives this set a status according to which the data set may be pasted into another of said applications upon request from the user via said input means. In general, all applications available in a portable phone are open. Therefore, there is no need for making a copy of the selected data. Instead, a link pointing out the data selected for copying could be provided. However, the user does not feel any difference. When a data set has been requested for copying, the controller unit analyzes the data set. The purpose of the analyzing is to break the data set down into small items, e.g. into words when these words were divided by spaces in the copied data set. When the user requests the paste operation, the controller unit offers the user each of said subitems for pasting.

According to a further embodiment of the invention, the memory means for temporarily storing data includes a RAM-like memory in which data for said applications and data for the display are stored. The handset or the phone is provided with a menu structure including a copy and paste option, and the controller unit establishes a link to the data set selected for copying upon the presence of a copy request. Upon the presence of a paste request, the controller splits the data set string into words divided by a space or the like and transfers the words to a display memory for displaying the word in the display as individually selectable items for pasting. Upon the presence of a select request, the controller unit copies the selected word into a position in said another application appointed by the paste request.

Preferably, the controller unit compares said word with syntax rules for words allowable in the present context of the application when pasting. The controller unit only transfers words which are allowable according to said comparison to the display memory for display.

BRIEF DESCRIPTION OF THE DRAWINGS

The invention will be explained more fully below in connection with preferred embodiments and with reference to the drawing, in which:

FIG. 3 shows a display picture illustrating a first example of copy and paste in accordance with the invention;

FIG. 4 shows a display picture illustrating a second example of copy and paste in accordance with the the invention;

FIG. 5 shows a display picture illustrating a third example of copy and paste in accordance with the invention.

DETAILED DESCRIPTION OF THE INVENTION

Figure 1:
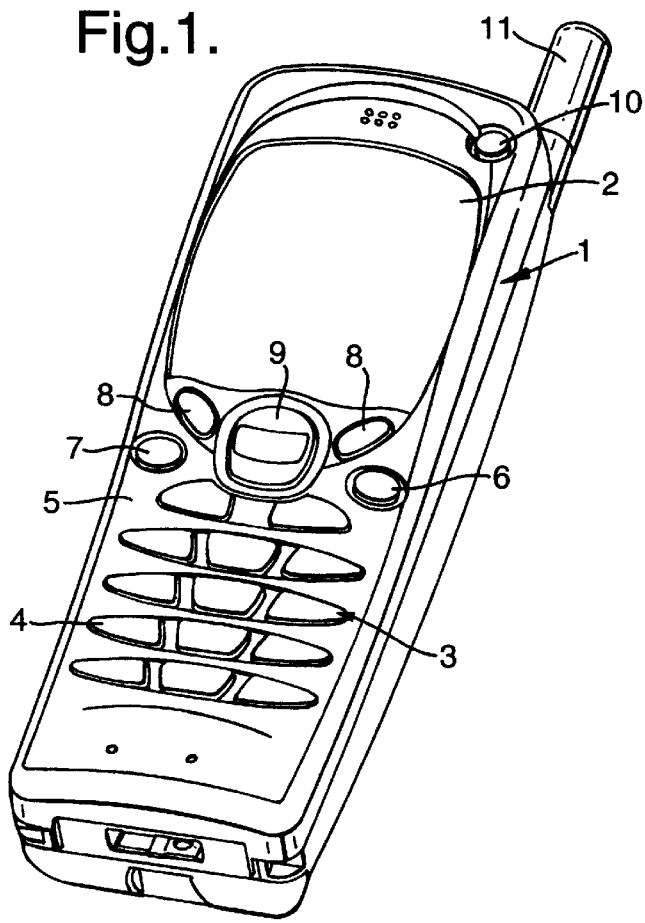
FIG. 1 shows a handset according to the invention.
Figure 2:
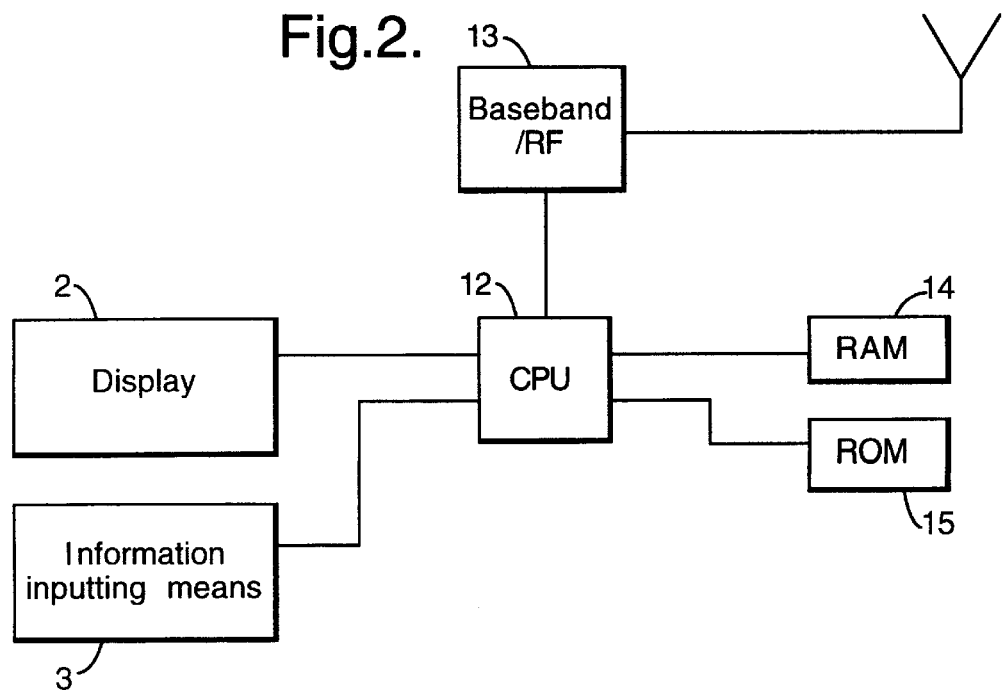
FIG. 2 shows the structure of the handset according FIG. 1.

A preferred embodiment of a handset or a phone 1 according to the invention is shown in perspective view in FIG. 1. The blocks in the phone necessary to understand the invention are shown in FIG. 2. The phone 1 includes means for inputting information, said means being preferably a keypad 3 which comprises a set of alphanumeric keys 4 in the shown preferred embodiment. The alphanumeric keys have the values 0–9, * and # in numeric mode and all normally used letters and a number of special signs in alphabetic mode. Two call handling keys 5 are used for establishing and terminating calls. A key 6 is used for switching between numeric mode and alphabetic mode for the keys 4. An erase key 7 is used for deleting the last-entered digit or letter, and, when long pressed, for bringing the phone back to idle mode.

The keypad 3 furthermore comprises two soft keys 8, whose functionality changes in dependence on the mode on the phone. The functionality of the soft keys 8 is controlled by a controller or a CPU 12 and is displayed in separate areas in the display 2, said areas being adjacent to the two keys 8. The soft keys 8 are preferably used to select and execute instructions entered by the other keys or suggested by the CPU 12 and displayed in the display 2.

A scroll key 9 is included in the keypad 3 for moving a cursor through the items shown in the display 2 and for jumping in the menu structure. The scroll key 9 will advantageously be able to move a display cursor in two directions and be able to select items pointed out by the cursor by having an integrated click function. The inputting means may be supplemented with means for voice recognition. In order to obtain an improved scrolling, the press-activated scroll key 9 may be replaced by a pivotal scrolling wheel or ball—preferably including a click functionality.

FIG. 2 shows the parts of the phone 1 essential for the understanding of the invention. The CPU 12 is responsible for the execution of the terminal program, and the CPU 12 controls the LCD display 2 via LCD drivers (not shown). The information and the instructions inputted by the keys 3 are supplied to the CPU 12. Based on this input, the CPU 12 controls various operations including the display operation and the communication with the cellular network via a transceiver provided by a baseband/RF unit 13 and an antenna 11.

The CPU 12 is connected to a ROM 15 for storing the terminal operation program and to a RAM 14 used as a working memory area by the CPU 12. The CPU 12 uses the RAM 14 as a primary storage used to hold programs and data for all applications available in the phone. The applications may be call handling including handling of an electronic phone book, SMS messages including handling of an in-tray and an out-tray, and handling of an electronic calendar. Other application may be calendar handling, Internet access, access to an electronic mail system and monitoring and control tasks.

According to one embodiment, a part of the RAM 14 acts as a clipboard for the copy and paste function for the phone according to the invention. The clipboard is reset every time the phone is switched off, and the clipboard is only active when the user has copied some data into it. It is very common at present to design the phone in a way so that the application cannot be switched on and off selectively. In this situation, all applications will be switched on when the phone is switched on. Therefore, there is no need for copying data from an application to the clipboard. It will be sufficient to create a link to the data selected for copying in the active application. When pasting is requested, the copying is performed.

However, by replacing the RAM 14 by other memory means maintaining the data while powered off, the contents of the clipboard may be maintained even though the phone is switched off. Such memory means may be an EEPROM or a flash ROM.

However, in the Communicator 9000 from the applicant, a phone and a palm top computer are integrated, and applications may be switched on selectively. In this case the copying of data to the clipboard will be relevant.

According to a first example shown in FIG. 3, the user wants to copy a phone number from a received SMS message into a record contained in the electronic phone book database of the phone. The idle mode display 20 and the displays in general have a display part 21 indicating the present functionality of the soft keys 8 and a display part 22 indicating the present mode of the phone, e.g. the present menu level. The user enters a "Messages" menu 25 via the main menu 23 of the phone. The navigation through the menu is state of the art and is known from the concept used in the applicant's phone, Nokia 8110. The user may navigate through the menu with a cursor 24 by using the scroll key 9 and select the item pointed out by the cursor 24 by pressing the appropriate soft key 8. When the user selects "Read SMS" via the "messages" menu 25, a submenu list 26 of incoming SMS messages will appear on the screen or the display 2. The user may in advance have selected to display unread messages sorted descending by date and time.

When the user moves the cursor 24 to a message, and presses the soft key 8 having the functionality "Copy" at the moment, he will only store a "link" to the selected data in the clipboard. He may also select the message for reading and the message will appear on the display 27. Then he may select the full message by pressing the copy soft key. The data comprises the received message and preferably also the ID of the sender, e.g. phone number and name (if recognized from the phone book). By pressing "quit", the user may now go to the idle mode.

Via the menu structure of the phone the user may enter a memory called phone book. This phone book may contain a number of records each including a name/label and a phone number and further optional data. In the phone book menu 28 the user may select "new entry" to create a new record. In the display 29 he is asked to enter the phone number, and he may select "Paste" by pressing the soft key 8 having the paste functionality. He may escape the "new entry" submenu by pressing the "clear" key 7, whereby the phone will return to the idle mode display 20. When the phone is prepared for handling several phone numbers on the same person, the next number entry may be selected by pressing "next". The functionality of the "next" soft key changes to "OK" when a number has been entered.

In general, the SMS message includes a text part in ASCII code, an identification (ID) of the sender and some kind of a time stamp. The text part of the present message is: "Hi Christian, could you call me back on +4533292000 or at home on +4599887766?", and the sender ID is defined by the sender defined to be his own E-mail address "jacob@nmp.com". According to an embodiment of the invention, these parts of the message are selected by the CPU 12 when the user requests copying.

Upon the presence of a pasting request, the CPU 12 starts to analyze the contents of the message. "Hi", "Christian", "could", "you", "call", "me", "back", "on", "or", "at", "home" and "on" are determined as being ordinary words, while "jacob@nmp.com" is identified as an E-mail address due to the "@" sandwiched between two continuous word having points as spaces. The words "+4599887766" and "+4533292000" are recognized as being phone numbers in the international + format due to the uninterrupted string of digits following the "+". In response to the paste command, the copied message will be displayed in the display 30 once more, but the cursor 24 highlights whole words and can only highlight words fitting into the context of the new application selected when pasting. In the present situation, the user may toggle between the two phone numbers by using the scroll key 9, until he selects one of the numbers or quits pasting by pressing one of the two soft keys 8.

If the user wants to store both numbers and the E-mail address in the phone book as private and office numbers and E-mail address, respectively, he is just to move the cursor to the locations successively. At each location he may press "paste", scroll and select. There is no need to copy more than once even though the copied dates have different destinations. This is advantageous compared with normal copy and paste for text editing.

According to a second example shown in FIG. 4, the user wants to transfer data including time information from an SMS message to an electronic calendar contained in the phone. Like in the first example, the user has entered a "Read SMS" menu 26 and copied the full message text in the display 27 to the clipboard. In the present example the message text is "Hi John, please meet me and John Carlisle, Unicom, Jun. 21, 1997 at 10.00 at my office." and the sender ID is here a name "John Turner, Managing Director, Fox-Com".

According to an embodiment of the phone, the calendar is connected to a timer, thereby allowing the items of the day and the coming days to be displayed together with the day of the week and the time. An item is entered into the calendar by entering the date(s) in question, an explaining text and optionally beginning and end times.

Via the menu structure of the phone the user may enter the calendar menu. Then he may select "new entry" in the calendar menu 31 to create a new item in the calendar. First, the calendar asks for a date in the input menu 32. This date is Jun. 21, 1997, and as will be explained with reference to FIG. 6, the analyzing algorithm may advantageously include an autoconvert functionality to convert this format into the format required by the calendar, e.g. 97.06.21. Even though "Jun. 21, 1997" will be displayed in the selection menu 33 upon a pasting request, the selection of the date will input "97.06.21" into the calendar. The user is asked for confirmation in the display window 34 upon the autoconversion. The autoconvension is language dependent, and therefore the autoconversion may advantageously be linked to the phone language selected by the user or to the SIM card. The date May 21, 1996 is normally expressed as 21.05.96 in German and as 96.05.21 in American English.

When confirmed, the calendar will ask for start and end times in the input menu 35 and 36, and the user may paste once more. This time he may select "10.00" as the start time. If there is no need for inputting start and end times, the user may just press the "next" soft key. The calendar now asks for some explanation of the entry in an input display 37. By pasting and selecting the words one by one the following text could be constructed "meet John Turner and John Carlisle Unicom at FoxCom" in the text entry display 38. The created text is of course editable by the editing menu of the phone. However according to the invention it is possible to copy a complex text structure and reconstruct a sentence during the pasting/selecting. A similar possibility is not available in normal text editing copy/paste operation. If both date and time are present in the copied string, the phone may be able to paste both items in the same "shot" if date and time are recognized unambiguously.

According to a third example shown in FIG. 5, the user wants to transfer a date included in the calendar into the phone book as the birthday of a person already appearing in the phone book. The user moves the cursor 24 via the calendar menu 39 to the desired date in the calendar list 40 and selects "Copy". When the user selects to copy an item having several independent subitems, the phone may advantageously ask (display image 41) the user whether he wants to copy the main item (the date) alone or the main item and all subitems. If he selects to copy the date alone (the main item), a link will be established on the clipboard to the date.

The analyzing algorithm will recognize the date as a date. When the user then enters a specific name into the phone book list 43 supporting multiple phone numbers, addresses, and presses "Paste", the phone display 44 suggests that the user pastes the only pastable item as a birthday, because this subitem requires a syntax corresponding to the word on the clipboard.

In accordance with an embodiment of the invention the user is allowed also to copy more complex structures into his clipholder, and afterwards offered an intelligent paste functionality. The copy/paste functionality becomes much more powerful, especially because manual highlighting of items for copying is too heavy for a small device like a hand portable phone, and because the manually highlighted items may not necessarily be in the proper format for pasting into the other application. The user interface handling is therefore much easier and faster.

Figure 6:
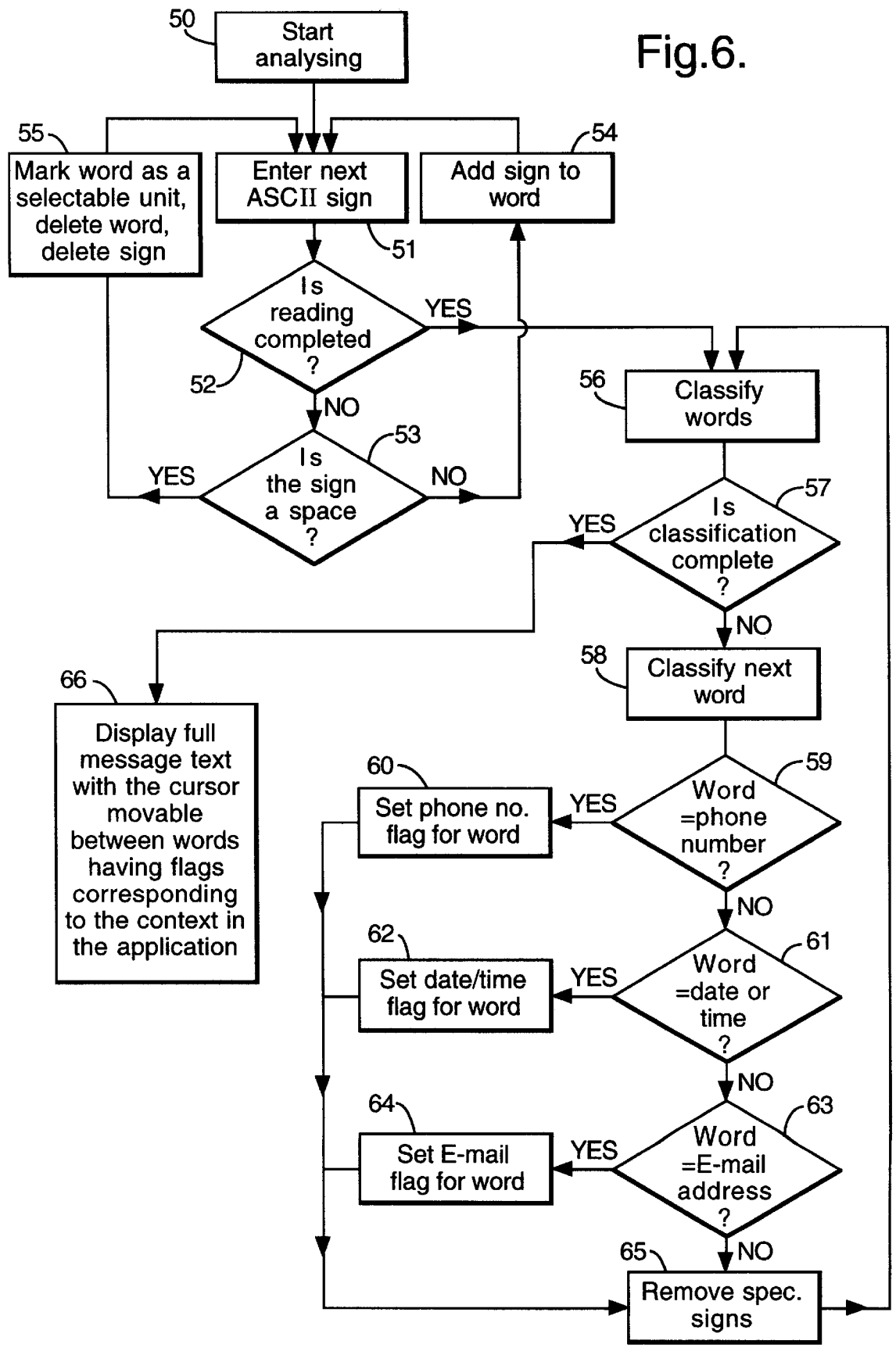
FIG. 6 shows a flow diagram for the analyzing algorithm used in an embodiment of the invention.

The algorithm for analyzing the copied data is illustrated by the flow diagrams shown in FIG. 6. Upon the detection of a paste request the algorithm starts to analyze the data in step 50. The data is read sign by sign in step 51 until it is detected in step 52 that there are no more data to read. In step 53 it is decided whether the last-read sign is a space or not. If the sign is not a space, the sign is added in step 54 as the last sign of a word constituted by signs read since the last space, and a new sign is read in step 51. If the sign was recognized in step 53 as being a space or a sign acting as a space, the sign in question is deleted in step 54. In step 55 the signs contained in the word constituted by signs read since the last space are decided to constitute a full word and are stored in the RAM 15. Then the algorithm starts to create a new word by reading signs in step 51. This procedure continues until all signs are read.

Then the CPU 12 starts to classify the words in step 56. The classification is continued until it has been detected in step 57 that all the words stored in the RAM 15 during the analyzing have been classified. The words for classification are entered successively in step 58. Words including a string of continuous digits are classified as possible phone numbers in step 59. The same phone number may appear in different formats as will be seen from the table below.

TABLE 1

| +459988776 | International + format |
| 00459988776 | Long international format |
| 99887766 | National format |
| 7766 | Local extension number |

Some "words" may fit into the syntax of different types of words. Therefore, these words may be pastable as dates, numbers and phone numbers into an application. Other words are difficult to classify as 1610, which could be a date (16 October), a time (4.10 pm), but also a product name of a phone manufactured by the applicant.

In step 65 non-digits starting and ending the string are removed. However a "+" sign is maintained to indicate the very useful International plus format. If the phone is able to detect the Long International format, the national escape codes "00" may advantageously be replaced automatically by the "+". In step 60 a flag indicating that the word is recognized as a phone number is set. Then the next word is analyzed.

If a word is not recognized as a phone number, the word is compared with the possible formats of dates and times in step 61. The same date may be expressed in different ways as will appear from table 2.

TABLE 2

| 1 | 21-04-97 |
| 2 | 21 April 1997 |
| 3 | 97.04.21 |
| 4 | 21 April, 97 |
| 5 | 21-Apr-97 |

Combinations of the different ways may be expected. Formats 1 and 3 are quite easy to handle—it is just a question of finding a word consisting of substrings divided by "." or "–". However, formats 2, 4 and 5 may be found by looking for the twelve three letter truncations for the month. In formats 2 and 4 the adjacent words have to be studied before the detection of a date is completed upon the detection of the letters "apr" for April (language dependent, but may be linked to the language selection). This means that a flag set for a word, e.g. "21", as being a possible phone number has to be corrected when it is realized that the word is part of a date. When an application, e.g. the calendar, requires a certain format, e.g. the format 3, as input, the CPU may advantageously autoconvert the format, when appropriate.

By adding some more complex syntax rules to the date identification part of the algorithm, e.g. a date expressed as just day and month (e.g. 2104, 21.04 21/4) may be recognized as a possible date—probably the first succeeding date in the same or the next year.

When one or more words are recognized as a date, a flag is set in step 62. The autoconvert may be performed in step 65.

In step 61 it is determined whether the word is a point of time e.g. 15.30 or 3.30 pm. In this case the syntax rules are quite simple—two digits following a "." following one or two digits. If the word is determined to be a point of time, the next word is controlled for being "am" or "pm". Autoconvert may be performed in step 65 for converting the format into the format supported by the calendar.

If the word is not a point of time, the algorithm detects in step 63 whether the word may be an E-mail address. The syntax rules for an E-mail address are quite simple—the algorithm looks for the "@" sandwiched between two continuous strings having points as spaces. If the word is detected to be an E-mail address, a flag is set for the hole string in step 64. If the word does not fit into the different syntaxes, the word is regarded as being an ordinary word and no flag is set.

When it is detected in step 57 that all words have been tested, the full copied text is displayed in the display 2. However, when moving the cursor, it jumps between the s or aggregate words (dates) fulfilling the syntax rules which apply to the selected position in the selected application.

When the analyzing is completed the result is displayed in step 66. The result could correspond to display 33 in FIG. 4.

Of course, the algorithm could just display the selectable words, but when more phone numbers appear in the text, the basic non-selectable text could be a guide when selecting the right one.

In general, the copy functionality fulfils the requirement for the editing in a phone, but in some situations a cut functionality could be useful. This command removes the original text when creating a copy on the clipboard.

Other types of words could be tested in the algorithm shown in FIG. 6. These types of word could include Internet addresses, e.g. http://www.nokia.com/, and words useful in different applications, e.g. names and addresses.

The described algorithm may be improved by adding an extra detection level, whereby the algorithm distinguishes between words which unambiguously fulfil the syntax rule; words which absolutely do not fit into the syntax; and words which may be fit into a given syntax, e.g. 15051997. This number can be interpreted as a valid Danish phone number or a valid date. Words that unambiguously fulfil the syntax rule may be directly selectable for pasting, while words which probably fulfil the syntax rule may be selectable from a second group of words accessible via the soft keys. The same may apply to the non-fitting words.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A method of transferring data from one application to another in an application handling unit of a mobile telephone controlling a plurality of applications, the transfer being handled by copying data from a message received in the phone and pasting only a portion of the data corresponding to a format of a receiving application of the phone, the method comprising the steps of:

identifying predetermined types of subitems in the contents of the data in the clipboard;

analyzing each subitem to determine if the subitem has a data format corresponding to a data format of the receiving application; and displaying only the subitems that are available for pasting into the receiving application for selection by the user, wherein upon activating a pasting command the user can paste one or more of the displayed subitems into the receiving application without having to individually copy and paste each subitem.

2. A method according to claim 1, wherein the step of identifying further comprises the steps of splitting the data into words divided by a space and classifying each word as having a format corresponding to a format of one or more receiving applications of the phone, wherein if the word does not have a format corresponding to the format of one or more of the receiving applications of the phone, the word is classified as an ordinary word and is not automatically selectable for pasting into a receiving application.

3. The method of claim 2, wherein if a word is not recognized as having a format corresponding to the format of the receiving application, the method further comprises the step of comparing the non-corresponding word with a list of possible word syntax rules, wherein if the non-corresponding word conforms to one of the word syntax rules, the non-corresponding word is autoconverted into the format of the receiving application.

4. A method according to claim 1, wherein the step of identifying further comprises the step of comparing each subitem in the data of the message with syntax rules for words allowable in the present context of the receiving application when pasting into the receiving application, and wherein only allowable words are displayed for selection and pasting.

5. A method according to claim 1, wherein the subitems are compared with syntax rules for subitems allowable in the present context of the receiving application when pasting, and only allowable words are displayed for selection, wherein if a word does not have a format corresponding to the format of the receiving application, the word is classified as an ordinary word and is not automatically available for pasting into the receiving application.

6. The method of claim 1, wherein the step of identifying predetermined types of subitems further comprises the steps of:

reading each data item in the contents of the data copied to the clipboard;

determining if each read data item is a number, a phone number, an address or a date; and excluding from the predetermined types of subitems all data items that are other than a number, phone number, address or date.

7. An application handling unit of a mobile telephone including a CPU controlling a plurality of applications, a working storage that holds data and programs used in the applications and a storage device acting as a clipboard when copying and pasting data from one application to another, the unit further comprising:

a selection device for selecting a receiving application into which selected data contained in one application can be copied from the clipboard;

a data format identifying device for identifying a data format of subitems in the contents of the data copied to the clipboard; and a display for displaying only those subitems having a data format corresponding to a data format of the receiving application for selection by the user upon reception of a pasting request for pasting the data on the clipboard into the receiving application.

8. An application handling unit according to claim 7, wherein the identifying device splits each data string in the data in the clipboard into words divided by a space and classifies each word as having a format corresponding to a format of one or more receiving applications of the phone, wherein if the word does not have a format corresponding to the format of one or more of the receiving applications of the phone, the word is classified as an ordinary word and is not automatically selectable for pasting into the receiving application.

9. An application handling unit according to claim 8, wherein the identifying means compares said word with syntax rules for words allowable in the present context of the application when pasting; and said displaying means as default displays words which are allowable according to said comparison.

10. An application handling unit according to claim 7, wherein the identifying device compares each word with syntax rules for words allowable in the present context of the application when pasting; and the display, in a default mode displays only those words which are allowable according to the comparison.

11. The application handling unit of claim 7, wherein the means for identifying predetermined types of subitems in the contents of the data copied to the clipboard further comprises:

means for reading each data item in the contents of the data copied to the clipboard;

means for determining if each read data item is a number, a phone number, an address or a date; and means for excluding from the predetermined types of subitems all data items that are other than a number, phone number, address or date.

12. A handset for a mobile phone allowing a user to establish a connection via a telecommunications network, said handset comprising:

a transceiver for communication with the network;

an input device for inputting information into the phone;

a display for displaying information;

a controller unit controlling the input device and the display, the activity of the transceiver and a plurality of applications available to the user;

the controller unit being provided with memory storage for temporarily storing data used in the applications;

the controller unit giving a data set used in one of the applications a status according to which the data set may be pasted into a receiving application upon request from the user via the input device; and the controller unit being adapted to analyze the data set for identifying subitems having a data format corresponding to a data format of the receiving application included in the data set, the controller unit being further adapted to offer to the user only those subitems having the format corresponding to the format of the receiving application for pasting into the receiving application.

13. A handset according to claim 12, wherein the memory storage for temporary storage includes a RAM-like memory in which data for the receiving applications and data for the display are stored, the mobile phone being provided with a menu structure including a copy and paste option, the controller unit, upon the presence of a copy request, establishing a link to the data set selected for copying, the controller, upon the presence of a paste request, splitting the data set string into words divided by a space and transferring only those words having the format of the receiving application to a display memory for displaying the word in the display as individually selectable items for pasting, and the controller unit, upon the presence of a select request, copying a selected word into a position in the receiving application identified in the paste request.

14. A handset according to claim 13, wherein the controller unit compares said word with syntax rules for words allowable in the present context of the application when pasting; and said controller unit only transfers words which are allowable according to said comparison to the displaying memory for display.

15. A handset according to claim 12 and used as a mobile terminal in a cellular communications network.

16. The handset of claim 12 wherein the subitems offered for pasting includes only data comprising numbers, phone numbers, addresses, e-mail addresses, Internet addresses and dates.

17. A method of automatically copying and pasting portions of information stored in a storage medium to a receiving application, the method comprising the steps of:

detecting a request to paste data from the information into a receiving application;

analyzing a content of the information to identify ordinary data words in the information and data items that have a format corresponding to a format of the receiving application;

identifying each data item in the information having a format corresponding to the format of the receiving application; and activating a data transfer function to transfer one or more of the identified data items into corresponding portions of the receiving application.

18. The method of claim 17, wherein the step of identifying further comprises the step of displaying the message to a user, wherein each identified data item is highlighted as being available for pasting into the receiving application.

19. The method of claim 17, wherein the step of identifying further comprises the step of displaying to a user only the identified data items of the message, each displayed identified data item being available for pasting into the receiving application.

20. The method of claim 17 wherein the storage medium and receiving application are stored in a mobile telephone.

21. The method of claim 17 wherein the step of analyzing further comprises the steps of:

reading each data item in the message sign by sign until all data items in the message are read and storing words formed by the reading of the signs; and classifying each word in the message as corresponding to one of a plurality of pre-determined data formats.

22. The method of claim 17 wherein the data format of the receiving application is a time, a phone number, an e-mail address, a date, or an Internet address.

23. The method of claim 17 wherein the step of analyzing further comprising the steps of:

determining that a data item does not have a syntax that corresponds to one of a plurality of pre-determined data formats; and storing each data item that does not have a syntax that corresponds to one of a plurality of pre-determined data formats as a non-corresponding data item in a second storage medium, the non-corresponding data item being selectable from a list of non-corresponding data items.

24. The method of claim 17 wherein upon activation of a paste request, a cursor in the display automatically jumps to a next data item that is available for pasting into the receiving application.

25. The method of claim 17 further comprising the step of using a scroll function to toggle between each identified data item in order to select a certain data item for transfer into the receiving application, wherein the selected data item is transferred into a corresponding destination in the receiving application upon activation of a paste command without having to copy the selected data item.

* * * * *